Patented Aug. 8, 1939

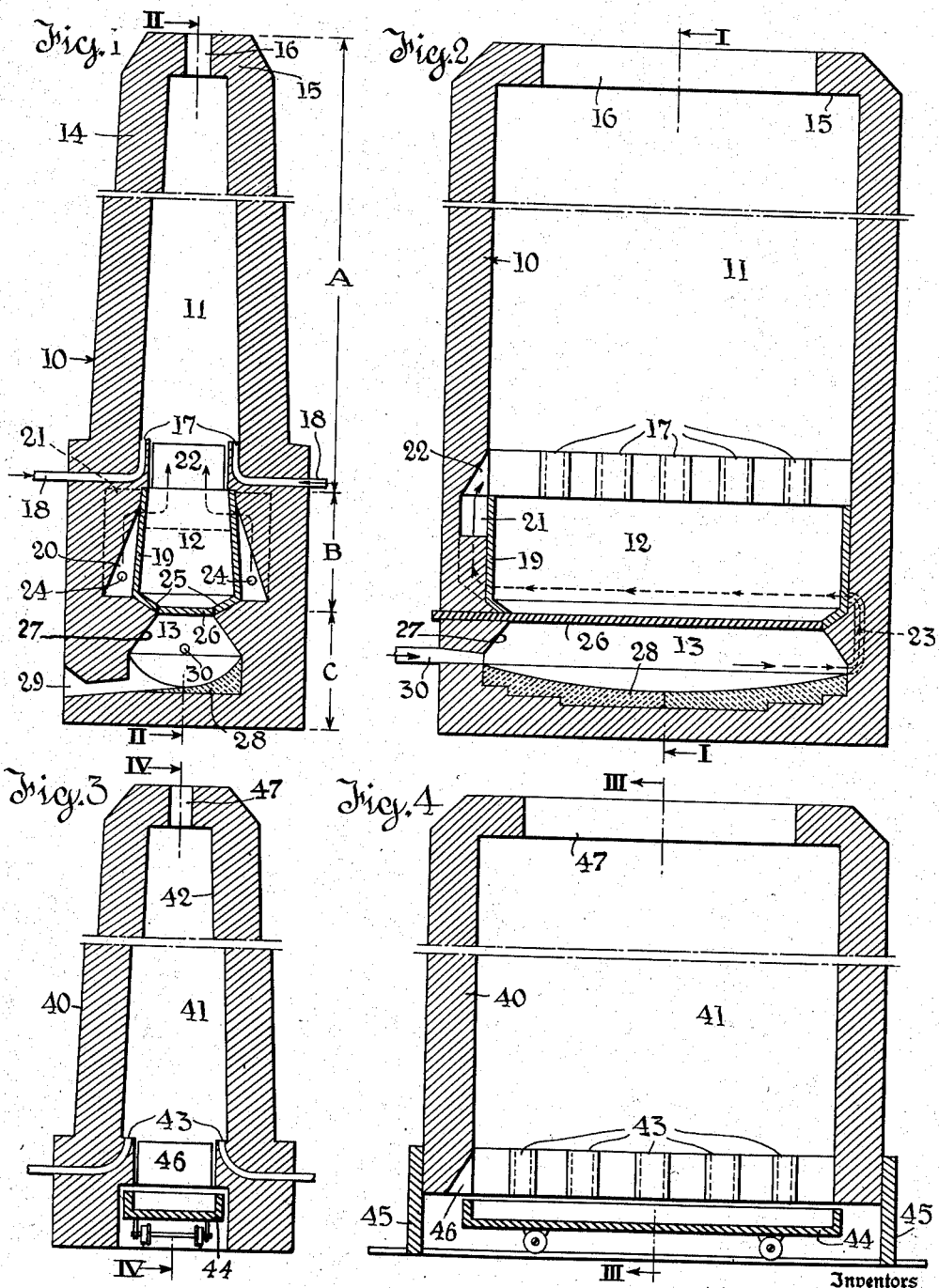

2,168,597

UNITED STATES PATENT OFFICE 2,168,597

PROCESS AND APPARATUS FOR THE DIRECT PRODUCTION OF STEEL AND OTHER METALS FROM ORE

Albert Auriol and André Auriol, Brussels, Belgium

Application January 13, 1938, Serial No. 184,870
In Belgium January 19, 1937

22 Claims. (Cl. 75—26)

The present invention relates to the thermal treatment of metallic ores and the like, and particularly to a process and apparatus for the recovery of metals and/or alloys from finely divided ores.

It is the object of this invention to rapidly produce metals and/or alloys directly from ores or other compounds, without the use of metallurgical coke or the like.

It is a further object of this invention to produce ferrous metals and/or their alloys with the aid of the gases and heat generated by the reduction process.

The invention is based on the utilization of finely divided or crushed particles of ore material to assure rapid heating and thorough reduction due to the extensive surface area of bodies treated in such form. Because of this finely divided condition of the particles undergoing treatment the reduction process is rapid and efficient, and the desired chemical reactions are more effective and complete. The removal of impurities and noxious elements is also facilitated by reason of the materials to be treated being in a finely divided condition.

The process of this invention contemplates treatment of the finely divided ore material in three separate and successive phases, all three phases of treatment being carried out in adjacent zones of a single piece of apparatus. These phases may be designated, preheating, reduction, and fusion.

The preheating phase comprises projecting the ore material upward along the interior walls of a vertical chamber or tower, the projected material being in contact with burning gases which are more or less concentrated in the center of the chamber, and which are effective to heat the projected materials while in motion and/or in suspension within the preheating zone of apparatus. The materials fall or float downwardly, shower like, in the center of the preheating chamber through hot and burning gases rising from the reduction zone. The preheated particles then pass or fall into the reduction zone of the apparatus where they are subjected to intense heat in the absence of air. The reduction phase of the treatment may conveniently take place in a chamber immediately beneath and in direct communication with the preheating chamber, the reduction zone of the apparatus being jacketed and heated indirectly by burned and/or burning gases which are confined within the jackets. The hot gases generated by the reduction process pass upwardly into the preheating zone where portions thereof are burned to supply at least a part of the heat required for preheating the ore materials. In the reduction phase, the reduced material collects at the bottom of the reduction chamber in the form of a magma or mass which serves as an effective barrier to separate the reduction zone from the underlying fusion zone. The fusion phase takes place at the underside of the magma and within a heated chamber immediately below the reduction chamber. It contemplates a concentration of heat from burning gases or other source of heat applied directly against the underside of the magma. The applied heat is of sufficient intensity to cause the molten metal, e. g., iron or alloy and dross to drip from the magma on to a suitable refractory hearth from which the metal or alloy may be withdrawn. The fusion step contemplates the use of combustible gas admitted to the fusion chamber through suitable jets or burners or the use of electrical heating means. The burning gases utilized to heat the fusion chamber are thereafter led to and through the jackets for heating the reduction zone. From the latter zone these gases pass to the preheating zone to furnish additional heat required in the preheating step.

Additional objects and advantages of the invention, and a better understanding of the novel process of this invention will be readily apparent from the following description of the apparatus which is illustrated, partly diagrammatically, in the accompanying drawing, in which:

Figure 1 is an elevation view in section of a preferred form of apparatus embodying our invention.

Figure 2 is an elevation view in section on line II—II of Figure 1.

Figure 3 is an elevation view in section of a modified form of apparatus.

Figure 4 is an elevation view on line IV—IV of Figure 3.

Referring to Figure 1, for the purposes of illustration, a vertical tower 10 is shown having a preheating chamber 11, a reduction chamber 12, and a fusion chamber 13. The tower 10 preferably has its side walls 14 inwardly tapered toward the narrow top 15, the latter being provided with an outlet 16 for escape of gases and combustion products. The tower 10, constructed of suitable brick or the like, is preferably rectangular in cross section, but may be of any desired shape. A plurality of inlet ducts or injector nozzles 17 are provided along the side walls and at the lower portion of the preheating zone A, said nozzles being adapted to direct a flow of finely divided or pulverized ore material upwardly along the inwardly tapering side walls of the preheating chamber 11. The nozzles 17 are connected by pipes 18 to suitable ore pulverizing and feeding or conveying devices, not shown. A supply of air together with finely divided coal, may also be introduced through said nozzles 17 along with the ore materials; or air and fuel may be introduced through some of the nozzles 17 and the ore materials through other of said nozzles. The height of the preheating zone depends on the temperature to which the finely divided materials are to be preheated, and likewise depends on the volume of materials and the volume and temperature of gases passing through the preheating zone in a given period of time.

The reduction chamber 12 is located directly beneath the preheating chamber 11, and is provided with a relatively thin wall 19 forming a jacket or passage 20 on both sides of the chamber 12. The jacket space 20 may extend completely around the reduction chamber or extend along the sides of the chamber, and communicates with a passage 21, shown in Figure 2, connected to an opening 22 in the lower part of the preheating chamber 11. Suitable baffles may be provided in the jacket space. The space 20 also communicates with the fusion chamber 13 by ducts 23. Suitable burners 24 for gaseous, liquid or solid fuel may be positioned in the space 20 to assist in heating the reduction zone B. The walls 19 of the reduction chamber flare outwardly toward the lower portion and then taper inwardly at 25 to form a shoulder to retain the magma which forms across said shoulder or neck portion. A metal plate 26 may be positioned in suitable grooves to close the opening at the bottom of the reduction chamber 12, in order to initially assist the formation of a magma across the neck 25 when the tower is first placed in operation. The plate 26 is adapted to melt and join with the metal produced by fusion of the magma.

The fusion chamber 13 is provided with tapering walls 27 designed to concentrate heat on the underside of the magma in fusion across the top of the chamber. The bottom of fusion chamber 13 is preferably made of refractory material 28, and provided with an outlet 29 through which the molten metal may be tapped. A fuel burner or burners 30, or an electric arc, or other electrical means, are provided in the fusion chamber 13 to supply the necessary heat. The hot gases are led from the fusion zone C by pipes 23 to the jacket space 20 to assist in heating the reduction chamber 12. Suitable peep holes not shown, may be located in various parts of the tower 10 as is well known in the art. Openings may also be provided for the addition of a deoxidizing substance directly into the reduction zone B. Likewise, openings may be provided for the addition of materials such as scrap iron, ores, flux, and the like, which openings are preferably to be provided adjacent the lower part of the tower, e. g., in the walls surrounding the fusion chamber 13.

The operation of the apparatus illustrated in Figures 1 and 2 is as follows:

The ore to be reduced and a suitable deoxidizing substance are preliminarily crushed to a granular or pulverized condition. The ore and the deoxidizing substance may be crushed together or separately. They are mixed in proper portions, together with any other desired additional substance. The finely divided mixture of materials to be treated may be preliminarily dried by the heat contained in combustion products and gases escaping from the apparatus through outlet 16. The finely divided materials are fed to the injector nozzles 17, and by means of air under pressure, the air being preferably heated, the material is discharged upwardly into the preheating zone. Air is supplied to the preheating zone 11 at least in the quantity required for the combustion of carbon monoxide (CO) gas escaping from the reduction zone B. As the injectors 17 are placed at the lower end of the preheating zone A and are directed upwardly along the walls of chamber 11, the finely divided materials are projected or blown upwardly along the walls, and absorb heat therefrom by conduction and/or radiation and reverberation. As the material travels upwardly, it is also dispersed and heated by the hot and burning gases rising in the center of the chamber toward outlet 16. The material gradually loses its momentum of projection and falls back or settles downwardly in the center of the chamber acquiring further heat in its descent by the upward rush of flames and hot gases rising from the reduction zone. The material undergoing treatment is thus preheated in zone A by the combustion of gases emanating from the reduction zone and by hot gases from the fusion chamber which have been circulated around the reduction zone jacket before issuing from openings 22 into the preheating chamber. The preheating zone may be further heated, if required, by the introduction of combustible fuel and air through the injectors. The rate of feed of materials to the preheating zone and the speed of their projection and settling into the reduction zone governs the preheating period and the temperature to which the materials are preheated. The materials are preferably preheated to approximately the reduction temperature. The preheated ore and deoxidizing materials entering or settling into the reduction zone B are further heated, if necessary, to the reduction temperature by the heat of hot gases passing through the jacket or space outside or around the reduction chamber walls 19, by the burning of combustible gases introduced through burners 24 into said jacket and by heat from the magma in fusion. The heat generated by chemical reaction within the reduction zone also promotes the reduction process. The carbon monoxide gas generated by the reduction process constantly rises into the preheating chamber, and thereby prevents any flow of oxidizing air from zone A downwardly into zone B. The ore particles are reduced and the reduced metal collects across the neck 25 of the reduction zone to form the desired magma at the bottom of this zone. A metal plate 26, inserted below the neck portion 25, is employed to assist the formation of a self-supporting magma across the neck 25 when the apparatus is first put in operation. Eventually the plate 26 is melted by the heat furnished by the burner 30 in the fusion zone, and the heat from this burner fuses the reduced metallic particles at the underside of the magma, the molten metal and/or alloy being collected on hearth 28 which forms the bottom of the fusion zone. A magma of sufficient thickness to be self-supporting is maintained across the neck 25 by controlling the amount of material injected into the tower and by regulating the operating temperatures, particularly that of the fusion zone. The molten metal and/or alloy may be tapped from the fusion zone by conventional means, shown at 29 in Figure 1, and likewise the gangue, slag, or dross may be removed.

The materials treated remain in the furnace or tower a relatively short time since they are suspended in air or gases in the preheating and reduction zones, and because the resulting magma is fused at a similar rate to that of its formation. Because of the small mass of materials present in the tower at a given instant, the heat applied is quickly utilized and the reduction reactions are nearly instantaneous.

The metallurgical characteristics of the product of this process may be easily and quickly controlled. Since the ore materials are in finely divided condition, and rapidly pass through the preheating, reduction and fusion phases, it is possible to vary the characteristics of the product without delay by changing the proportions or nature of the injected materials and/or by changing the temperatures in the various phases. The necessary delay in changing the product or its characteristics that occurs in conventional processes for reducing ores, in which a very large furnace or tower is completely filled with a relatively large mass of slowly moving materials, is not present in this novel process. The rapidity of the process assures precise control, since undesirable factors may be quickly corrected.

The process and apparatus of this invention is well adapted for the treatment of all ferrous ores for the direct preparation of iron, steel, or other ferrous alloys. It is also adapted for the thermal treatment of copper ores and the like.

The modified apparatus shown in Figures 3 and 4 corresponds substantially to the preheating zone of the tower illustrated in Figures 1 and 2. The tower 40 is provided with a chamber 41 defined by inwardly tapered walls 42, and may be rectangular in cross section and constructed of brick or the like. A plurality of inlet ducts or nozzles 43 are provided along the lower side walls of the chamber 41 and directed upwardly along the inwardly inclined walls 42. A hearth 44, preferably movable as shown, but which may be stationary, is provided below the chamber 41, a suitable opening 45 being provided to permit removal of the hearth 44 from the tower. An outlet 47 is provided in the top of the tower. The chamber 41 may be heated by a rising column of hot and/or burning gases introduced through an opening 46 adjacent the nozzles 43, as shown, or below the hearth 44. These gases may be obtained from any available source. If desired, the chamber 41 may be heated by the combustion of fuel injected by the nozzles 43, either with or without the material to be treated, as in the operation of the apparatus of Figures 1 and 2. Fuel burners may or may not be provided in the passage leading to opening 46.

In the operation of the apparatus shown in Figures 3 and 4, finely divided materials are projected upwardly into the chamber 41 along walls 42 from the nozzles 43. Air in quantity suited to the particular thermal operation may be introduced with said materials. The finely divided material is heat treated while in suspension within the tower, and may or may not collect in the form of a magma on the hearth 44 for further treatment, depending on final product to be produced. The thermal treatment may be for the purpose of drying, roasting, reduction, oxidation, calcination, recuperation, agglomeration, or the like.

Obviously, various arrangements of chambers and heating means may be designed by those skilled in the art without departing from the scope of our novel process and apparatus which contemplate the use of any equivalent apparatus, within the terms of the following claims.

We claim:

1. A method for rapidly reducing finely divided mineral material which includes preheating said material by projecting the same in upwardly directed streams within a chamber, maintaining gases of controlled flow and temperature, allowing the material to fall through said gases into a reduction zone, maintaining a deoxidizing atmosphere within said reduction zone, collecting the reduced material in the lower part of said reduction zone, and fusing said material by additional heat applied directly to the underside of the collected material.

2. The method of reducing ore material within a chamber which includes the steps of preheating said material by projecting it in finely divided form upwardly into upwardly moving hot gases in said chamber and thereafter allowing said material to fall downwardly through said gases, reducing said preheated finely divided material in a reducing atmosphere, collecting said reduced material, fusing the reduced material by the application of heat thereto, and collecting the fused metal in the bottom of said chamber.

3. The method of reducing ore material which includes the steps of preheating said material by projecting it in finely divided form upwardly into a chamber containing hot gases and thereafter allowing said material to fall downwardly through said gases, reducing said preheated material in a reducing atmosphere utilizing part of the heat of said gases in the reduction step before said gases are used in the preheating step, collecting the reduced material, fusing the reduced material by the application of sufficient heat to cause the reduced metal to fuse at the same rate as it is preheated and reduced, and collecting the fused metal in the bottom of said chamber.

4. The method of reducing ore material within a chamber which includes the steps of preheating said material by projecting it in finely divided form upwardly on opposite sides of a column of hot gases into which said material travels and thereafter falls downwardly, reducing said preheated material in a deoxidizing atmosphere, collecting said reduced material as a magma, fusing the reduced material by the application of additional hea to the underside of said magma, and collecting the fused metal in the bottom of said chamber.

5. The method set forth in claim 4 in which a deoxidizing substance is introduced into said ore material after the ore material passes from the preheating phase.

6. The method of rapidly reducing ore material within a chamber which includes the steps of preheating said material to approximately its reduction temperature by projecting it in finely d'vided form with a finely divided deoxidizing substance upwardly into hot gases and allowing said material and substance to fall downwardly through said gases, reducing said preheated material in the deoxidizing atmosphere produced by said substance, collecting said reduced material, fusing the reduced material by heat applied directly to the underside thereof, and collecting the fused metal in the bottom of said chamber.

7. The method of rapidly reducing ore material which includes the steps of preheating said material by projecting it in finely divided form with finely divided coal upwardly within a chamber into hot gases and allowing said material and coal to thereafter fall downwardly through said gases, reducing said preheated material in a deoxidizing atmosphere, collecting the reduced material, fusing the reduced material by heat applied directly to the underside thereof, and collecting the fused metal in the bottom of said chamber.

8. A method for the rapid and economical production of metal from its ore in which the ore is treated successively in its passage through contiguous zones of a single treating chamber, the steps comprising, projecting a mixture of ore and deoxidizing material upwardly, in finely divided state, into a preheating zone occupying the upper part of said chamber and in the presence of a limited supply of air insufficient in amount to produce complete combustion of the said oxidizing material, regulating the supply and projection force of said mixture of material so that in its upward and subsequent downward travel within the said zone the ore will be heated to the approximate temperature necessary for its reduction, checking the downward travel of the ore particles after their continued downward passage through an intermediate zone of reduction, maintaining the material in said reduction zone at the reduction temperature with exclusion of air for a sufficient interval of time to effect reduction of the ore particles, collecting a magma of reduced ore particles at the bottom of the reduction zone to close the same against entry of oxidizing gases from the underlying zone, fusing the reduced ore particles at the under surface of said magma by the direct application of heat thereto in regulated amount sufficient to produce fusion to an extent that causes drops of fused metal to fall from the under surface of the magma at a rate which is substantially equal to the rate of formation of the magma of reduced ore particles, and conducting hot gases from both the fusion and reduction zone of treatment for supplying heat to the above lying zones, the gases rising from the reaction in the reduction zone being effective to exclude air from entering said zone and these gases burning in the above lying preheating zone to supply their heat of combustion to the material in the preheating step.

9. The method set forth in claim 8 in which the ore and deoxidizing material is initially heated by heat contained in the gases escaping from said preheating zone before the projection of said material into said treating chamber.

10. The method set forth in claim 8 in which a substance is supplied to the fusion zone where it is combined with the fused metal to produce an alloy.

11. The method set forth in claim 8 in which a combustible fuel is projected into the preheating zone along with sufficient air for its combustion to provide by combustion a portion of the heat required to preheat the mixture of material to the approximate reduction temperature.

12. The method set forth in claim 8 in which the ore particles in said reduction zone are maintained at the reduction temperature by the application of heat to the external surface of the walls defining said reduction zone.

13. Apparatus for rapid reduction of ore material in finely divided form of particle size, the combination comprising a tower like treating chamber the vertical extent of which defines a plurality of contiguous zones each in direct communication with adjacent zones, means for projecting the finely divided material upwardly into the uppermost zone of the chamber, and means for regulating the heating and controlling the atmosphere of the individual zones whereby the material in its fall subsequent to its upward projection traverses the treating zones successively, to be first heated and subsequently subjected to the desired chemical and/or physical change.

14. Apparatus for the rapid thermal treatment of finely divided mineral material comprising, in combination, a vertically extending tower defining a plurality of communicating contiguous zones, at least two opposite walls of said tower defining the uppermost zone being inclined toward each other, a plurality of injector nozzles adjacent the base of said inclined walls and directed upwardly for projecting streams of said finely divided material upwardly into said uppermost zone from which said material travels downwardly through the said zones successively, and means for heating said zones and controlling the atmosphere within said zones to subject the said material to controlled thermal treatment while in its finely divided condition.

15. Apparatus for the rapid thermal treatment of finely divided mineral material comprising, in combination, a vertically extending tower providing three contiguous communicating zones, the uppermost zone having an inlet adjacent its lower end for the admission of gases thereto and having an outlet adjacent its upper end for the escape of said gases, means for projecting the said finely divided mineral material upwardly into said upermost zone of said tower, the intermediate zone of said tower being provided with a heating jacket in communication with said inlet and adaped to have hot gases circulated therethrough for indirectly heating said intermediate zone, said intermediate zone having shoulders forming a neck of reduced area at the junction of said zone with the lowermost zone, and heating means within said lowermost zone for treating materials extending across and supported by said shoulders, said lowermost zone being connected by a passage to said heating jacket for conducting hot gases from said lowermost zone to said jacket.

16. Apparatus as set forth in claim 15 in which a fusible metal plate extends across the shoulders between said intermediate and said lowermost zones to assist the initial formation of a magma of treated materials extending across and supported by said plate and shoulders.

17. Apparatus for the rapid thermal treatment of finely divided mineral material comprising, in combination, a vertically extending tower defining a plurality of communicating contiguous zones, means for projecting the said finely divided mineral material upwardly into the uppermost zone of said tower, an intermediate zone of said tower being directly beneath said uppermost zone for receiving said finely divided material as it falls downwardly from said uppermost zone into said intermediate zone, at least two opposite walls of said intermediate chamber being inclined toward each other, shoulders extending into the lower portion of said intermediate zone from the base of said walls to provide a neck portion for checking the downward fall of said finely divided material and to aid in collecting the material in the form of a magma extending across and supported by said shoulders, heating means within said lowermost chamber for heating the underside of said magma, and means in the bottom of said lowermost zone for collecting the treated material.

18. Apparatus for the rapid and economical production of metal from its ore in which the ore is treated successively in its passage through contiguous zones of said apparatus, comprising a tower like treating chamber, the vertical extent of which defines three contiguous zones each in direct communication with the adjacent zone, the uppermost zone of said chamber constituting a preheating zone, means for projecting a mixture of finely divided ore and deoxidizing material and a limited supply of air upwardly into said preheating zone, the intermediate zone of said chamber being directly beneath and in open communication with said preheating zone for receiving said finely divided material as it falls downwardly from the preheating zone into said intermediate zone, a heating jacket for indirectly heating said intermediate zone to maintain the preheated material therein at the approximate temperature necessary for the reduction of the ore, shoulders extending into the lower portion of said intermediate zone to provide a neck portion for checking the downward fall of said finely divided material and to aid in collecting the material in the form of a magma extending across and supported by said shoulders to form a barrier between said intermediate zone and the lowermost zone, heating means within said lowermost zone, a wall of the chamber of said lowermost zone being inclined toward said shoulders for concentrating heat from said heating means on the underside of said magma, a passageway extending from said lowermost zone to said jacket for conducting hot gases to said jacket, and means in the bottom of said lowermost zone for collecting the fused metal.

19. A method for the rapid reduction of finely divided mineral material within a chamber which comprises projecting said material in an upwardly directed stream along the walls of said chamber, allowing the material to fall through contiguous zones of controlled temperature and air supply, introducing into said chamber a substance capable of producing a reducing atmosphere, and maintaining a reducing atmosphere in one of said zones.

20. A method for the rapid reduction of finely divided mineral material which comprises projecting said material with air in upwardly directed streams along the inner walls of a chamber, simultaneously introducing into said chamber hot gases and a substance capable of producing a reducing atmosphere, controlling the air supply and the temperature of said gases while allowing the material to fall in contact with said gases through a vertical distance as great as its upward projection, and maintaining a reducing atmosphere in a portion of said chamber.

21. The method of reducing finely divided mineral particles which includes the steps of projecting said particles upwardly within a chamber into an upward flow of hot gases, introducing into said chamber a substance capable of producing a reducing atmosphere, controlling the flow and temperature of said gases and the projection of said particles to cause the latter to fall downwardly through said gases, maintaining a reducing atmosphere in a portion of said chamber to effect the desired reduction, and collecting said reduced mineral below said column of gases.

22. The method of reducing finely divided mineral particles which includes the steps of projecting a mixture of said particles and a combustible substance capable of producing a reducing atmosphere upwardly along the inner walls of a chamber into an upward flow of hot gases, controlling the flow and temperature of said gases and the projection of said particles to cause the latter to fall downwardly through said gases, maintaining a reducing atmosphere in a portion of said chamber to effect the desired reduction, and collecting said reduced mineral below said column of gases.

ALBERT AURIOL.
ANDRÉ AURIOL.